United States Patent
Shah et al.

(10) Patent No.: US 10,298,581 B2
(45) Date of Patent: May 21, 2019

(54) ZERO-TOUCH IOT DEVICE PROVISIONING

(71) Applicant: Cisco Technology, Inc., San Jose, CA (US)

(72) Inventors: Rashmikant B. Shah, San Jose, CA (US); Brian E. Weis, San Jose, CA (US); Kannan Kumar, San Jose, CA (US); Manoj Kumar Nayak, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 15/582,113

(22) Filed: Apr. 28, 2017

(65) Prior Publication Data

US 2018/0316673 A1    Nov. 1, 2018

(51) Int. Cl.
    *H04L 29/06*    (2006.01)
(52) U.S. Cl.
    CPC .......... *H04L 63/0892* (2013.01); *H04L 63/20* (2013.01); *H04L 63/166* (2013.01)
(58) Field of Classification Search
    CPC ... H04L 63/0892; H04L 63/166; H04L 63/20; H04L 63/08; H04L 41/5054
    USPC .......................................................... 726/1
    See application file for complete search history.

(56) References Cited

U.S. PATENT DOCUMENTS

| 7,835,274 | B2 * | 11/2010 | Chapman | ............ | H04L 29/1282 370/229 |
| 9,077,544 | B2 | 7/2015 | Baker et al. | | |
| 9,317,688 | B2 | 4/2016 | Yegin et al. | | |
| 9,461,976 | B1 | 10/2016 | Smith et al. | | |
| 2008/0147840 | A1 * | 6/2008 | Roelens | ............... | H04L 41/0803 709/223 |

(Continued)

FOREIGN PATENT DOCUMENTS

WO    WO-2016003311 A1    1/2016

OTHER PUBLICATIONS

Müller, Robert, Marcel Waldvogel, and Daniel Kaiser. "Distributed Systems Laboratory HomeCA: Scalable Secure IoT Network Integration." (Year: 2017).*

(Continued)

*Primary Examiner* — Syed A Zaidi
(74) *Attorney, Agent, or Firm* — Behmke Innovation Group LLC; James Behmke; Stephen D. LeBarron

(57) ABSTRACT

In one embodiment, an authorized signing authority server receives an authenticity request from a security registrar to vouch for authenticity of a particular device. Based on receiving the authenticity request, the authorized signing authority server may then determine an authenticity state of the particular device, and may also request a device provisioning file for the particular device from a device provisioning server, the device provisioning file defining one or more network security policies for the particular device. Upon receiving the device provisioning file from the device provisioning server, the authorized signing authority server may then return the authenticity state and the device provisioning file for the particular device to the security registrar, causing the security registrar to complete authentication of the particular device based on the authenticity state and the device provisioning file.

20 Claims, 7 Drawing Sheets

(56) References Cited

U.S. PATENT DOCUMENTS

| | | | | |
|---|---|---|---|---|
| 2014/0041004 A1* | 2/2014 | Stewart | ............. | H04L 63/08 |
| | | | | 726/7 |
| 2015/0222621 A1 | 8/2015 | Baum et al. | | |
| 2016/0323689 A1* | 11/2016 | Goluboff | ............. | H04L 63/0823 |
| 2017/0041793 A1* | 2/2017 | Lee | ............. | H04L 41/28 |
| 2017/0134688 A1* | 5/2017 | Yoon | ............. | H04N 5/772 |
| 2017/0223011 A1* | 8/2017 | Schultz | ............. | H04L 63/0823 |

OTHER PUBLICATIONS

Blackmer, Marc. "Scaling Security for The Internet of Things with MUD" 2016. (Year: 2016).*
Pritkin, M. "Bootstrapping Remote Secure Key Infrastructures (BRSKI)" Mar. 13, 2017. (Year: 2017).*
Lear, E. "Manufacturer Usage Description Specification" Mar. 8, 2017. (Year: 2017).*
Watson, K. "Voucher Profile for Bootstrapping Protocols" Mar. 15, 2017 (Year: 2017).*
Lear, et al., "Manufacturer Usage Description Specification", Network Working Group Internet-Draft, <draft-lear-ietf-netmod-mud-04>, Aug. 1, 2016, 26 pages, Internet Engineering Task Force Trust.
Pritikin, et al., "Bootstrapping Remote Secure Key Infrastructures (BRSKI)", ANIMA WG Internet-Draft, <draft-ietf-anima-bootstrapping-keyinfra-03>, Jun. 30, 2016, 46 pages, Internet Engineering Task Force Trust.

\* cited by examiner

ZERO-TOUCH IOT DEVICE PROVISIONING

TECHNICAL FIELD

The present disclosure relates generally to computer networks, and, more particularly, to zero-touch Internet of Things (IoT) device provisioning.

BACKGROUND

The Internet of Things (IoT) presents new challenges to network and security policies, given the vast number of devices, their generally minimalistic sophistication, and their supposed ease of use (e.g., "plug and play"). Currently, there are a number of independent protocols for IoT-related issues, such as bootstrapping new IoT devices, determining authorization and an access control policies for the devices, propagating access port security configuration, and so on. However, such methods are currently independent and uncoordinated, resulting in a complicated and possibly inconsistent configuration.

BRIEF DESCRIPTION OF THE DRAWINGS

The embodiments herein may be better understood by referring to the following is description in conjunction with the accompanying drawings in which like reference numerals indicate identically or functionally similar elements, of which.

DESCRIPTION OF EXAMPLE EMBODIMENTS

Overview

Figure 1:
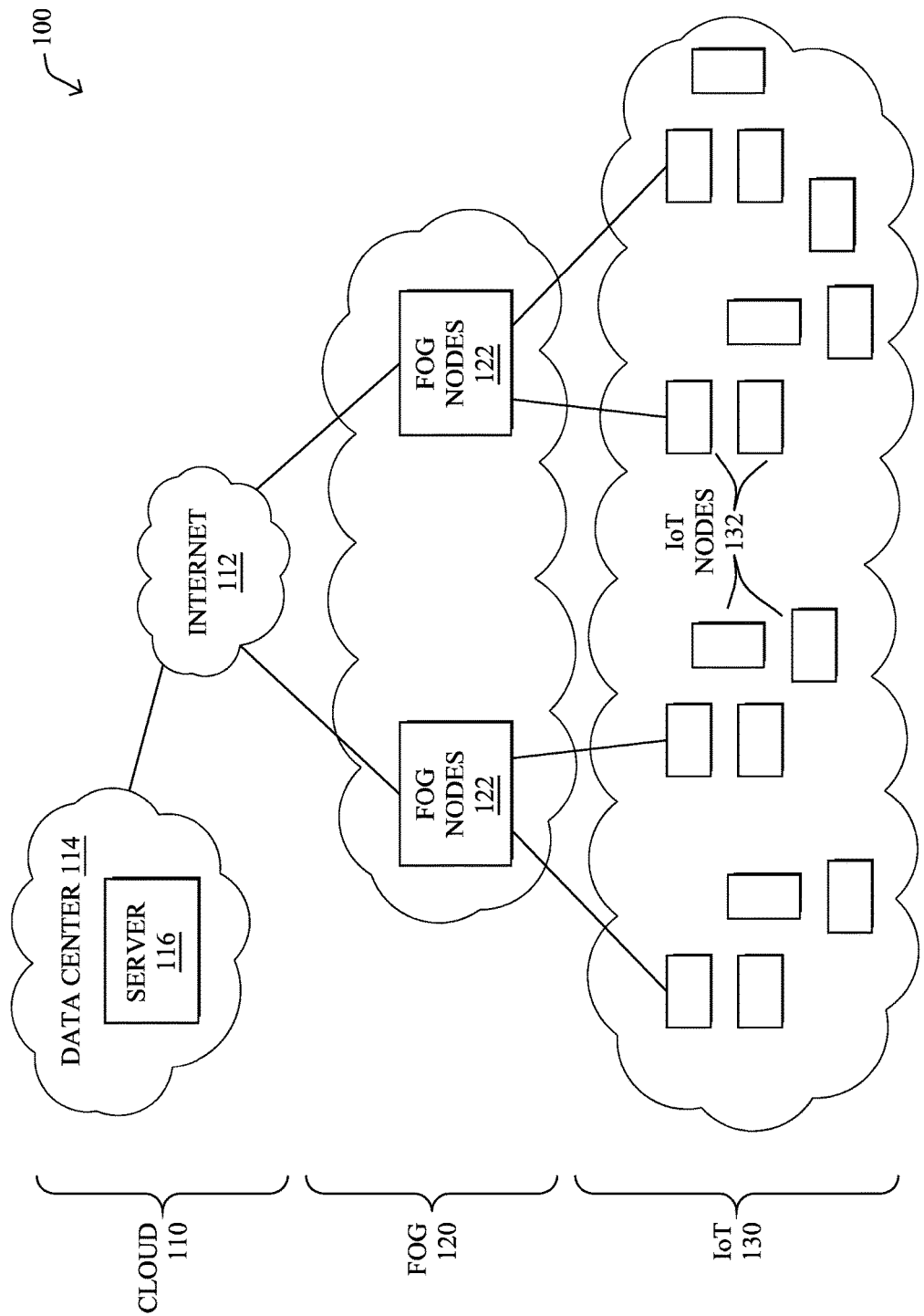
FIG. 1 illustrates an example computer network.

According to one or more embodiments of the disclosure, an authorized signing authority server (e.g., a Manufacturer Authorized Signing Authority (MASA) server) receives an authenticity request (e.g., a Bootstrapping Remote Secure Key Infrastructures (BRSKI) protocol request) from a security registrar (e.g., BRSKI registrar and/or authentication, authorization, and accounting (AAA) server) to vouch for authenticity of a particular device (e.g., an Internet of Things (IoT) device). Based on receiving the authenticity request, the authorized signing authority server may then determine an authenticity state of the particular device, and may also request a device provisioning file (e.g., a Manufacturer Usage Description (MUD) file) for the particular device from a device provisioning server (e.g., MUD server), the device provisioning file defining one or more network security policies for the particular device. Upon receiving the device provisioning file from the device provisioning server, the authorized signing authority server may then return the authenticity state and the device provisioning file for the particular device to the security registrar, causing the security registrar to complete authentication of the particular device based on the authenticity state and the device provisioning file.

According to one or more additional embodiments of the disclosure, a security registrar receives a security key request (e.g., BRSKI request) for a particular device, and transmits an authenticity request to an authorized signing authority server for the authorized signing authority server to vouch for authenticity of the particular device. This authenticity request may then cause the authorized signing authority server to request a device provisioning file for the particular device from a device provisioning server, the device provisioning file defining one or more network security policies for the particular device. As such, the security registrar may then receive, from the authorized signing authority server, an authenticity state and the device provisioning file for the particular device, and may complete authentication of the particular device based on the authenticity state and the device provisioning file, accordingly.

Description

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using layers of devices at or near the network edge to provide application services to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, energy reserves, load factors, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, optionally across multiple fog layers, as described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other. Resources in fog nodes 122 and the links surrounding them may be shared between different users, applications, organizations or tenants.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
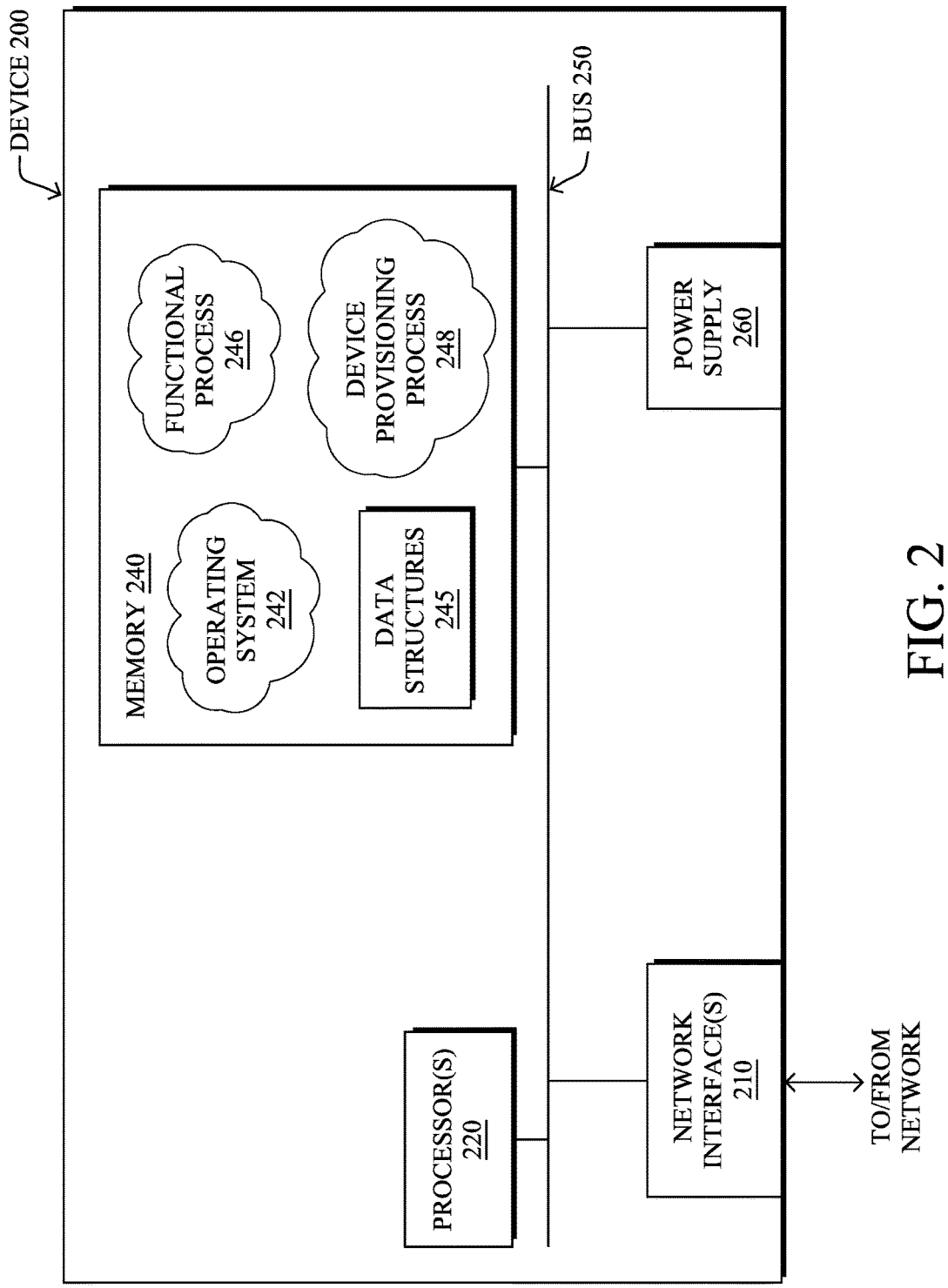
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "device provisioning" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Zero-Touch IoT Device Provisioning

IoT networks present new challenges to network and security policies. In particular, in many IoT solutions and verticals, zero-touch provisioning of the devices is required in order to securely add the IoT devices to a customer network. This provisioning must be done without any human interaction, and perhaps without any prior knowledge of the network administrator that the device would need to be added to the network. Certainly a network administrator has no advance knowledge of where the IoT device would be added to the network so that it can apply a strict access control policy. In some cases the IoT devices will be pre-authorized (e.g., on a white list), which helps the network administrator, but in many cases this will not be the case. No matter what, the network administrator needs a system that can automatically authenticate, authorize, and define access control policy for the IoT devices that show up someplace on their network.

Several protocols have been defined that provide parts of such a solution. For example, initial bootstrapping of unexpected new IoT devices can be done with the Bootstrapping Remote Secure Key Infrastructures (BRSKI) protocol (e.g., bootstrapping a new device to obtain a cryptographic identity of a new security key). Determining authorization and an access control policy for the device can be done if it supports Manufacturer Usage Description (MUD) Specification. For instance, since IoT networks present new challenges to network and security policies. In particular, the Manufacturer Usage Description (MUD) Specification (draft-lear-ietf-netmod-mud-04) describes how a policy engine/authentication server can harvest a MUD uniform resource identifier (URI) presented by an IoT device. It then resolves the MUD URI and creates network policy for the IoT device, and forwards the access policy to the access port to which the IoT device is attached. This effectively limits the access of the IoT device to the network (an IoT device typically has a limited number of servers to which it must communicate). Furthermore, an access port security system using IEEE 802.1X and/or Media Access Control (MAC) Authentication Bypass (MAB) restricts access to devices according to a static policy.

However, all of these methods are currently independent, and not coordinating either the state of port security or the authorization state of the device. Using these methods together results in a complicated and possibly inconsistent port security model. For example, a port security system attempts to keep the port "closed" at all times except for the network packets that are essential for completing authentication and opening up the port to application packets. Today, when port security is used with a zero-touch provisioning method (such as BRSKI), the port must be opened at the Ethernet level, and an IP access control list (ACL) placed on the port that only allows packets matching a BRSKI profile. This is somewhat risky, since layer-2 (L2) packets are not blocked, and non-IP layer-3 (L3) packets won't be blocked. This also requires the use of MAB on the port, which determines access control policy based on a MAC address, which can lead to an attacker gaining access to the system using a spoofed MAC address. This is even the case when MUD is used with MAB, since the IP ACLs installed for MUD policy are based on a MAC address even before the MAC address has been authenticated.

From a different perspective, a manufacturer willing to aid their customers by providing zero-touch provisioning policy for their IoT devices finds themselves administering at least two uncoordinated servers: a MUD file server and a BRSKI Manufacturer Authorized Signing Authority (MASA) server (e.g., to provide vouchers of authenticity for IoT devices). Not only are these servers still uncoordinated, resulting in potentially inconsistent port state, but having independent servers costs the manufacturer more in server bandwidth, since two uncoordinated sets of network accesses will occur whenever a device is being provisioned.

The techniques herein, therefore, merge the inefficient multi-stage policy-related provisioning into a unified process for zero-touch provisioning of IoT devices, including gaining initial trust of the device, authentication, and access control based on manufacturer's recommendations. Enterprise networks and IoT networks would both have better efficiency and security if these protocols were better coordinated, e.g. integrated into a single method such that a consistent port state is maintained. The techniques herein block access from the device to the network until the process completes, and simplify and optimize the manufacturer's processes by illustratively combining a MUD file server and a MASA server into a cohesive unit. (As described below, the techniques herein also enable the use of MUD without the device passing a MUD URI, which makes MUD useful in many more scenarios.)

Specifically, according to one or more embodiments of the disclosure as described in detail below, an authorized signing authority server (e.g., a MASA server) receives an authenticity request (e.g., a BRSKI protocol request) from a security registrar (e.g., BRSKI registrar and/or AAA server) to vouch for authenticity of a particular device (e.g., an IoT device). Based on receiving the authenticity request, the authorized signing authority server may then determine an authenticity state of the particular device, and may also request a device provisioning file (e.g., a MUD file) for the particular device from a device provisioning server (e.g., MUD server), the device provisioning file defining one or more network security policies for the particular device. Upon receiving the device provisioning file from the device provisioning server, the authorized signing authority server may then return the authenticity state and the device provisioning file for the particular device to the security registrar, causing the security registrar to complete authentication of the particular device based on the authenticity state and the device provisioning file.

Illustratively, the techniques described herein may be performed by hardware, software, and/or firmware, such as in accordance with the device provisioning process 248, which may include computer executable instructions executed by the processor 220 to perform functions relating to the techniques described herein, e.g., in conjunction with corresponding processes of other devices in the computer network as described herein. For instance, device provisioning process 248 on a security registrar would perform functions related to the security registrar in conjunction with other devices, while device provisioning process 248 on an authorized signing authority server would perform functions related to the authorized signing authority server in conjunction with other devices, and so on.

Figure 3:
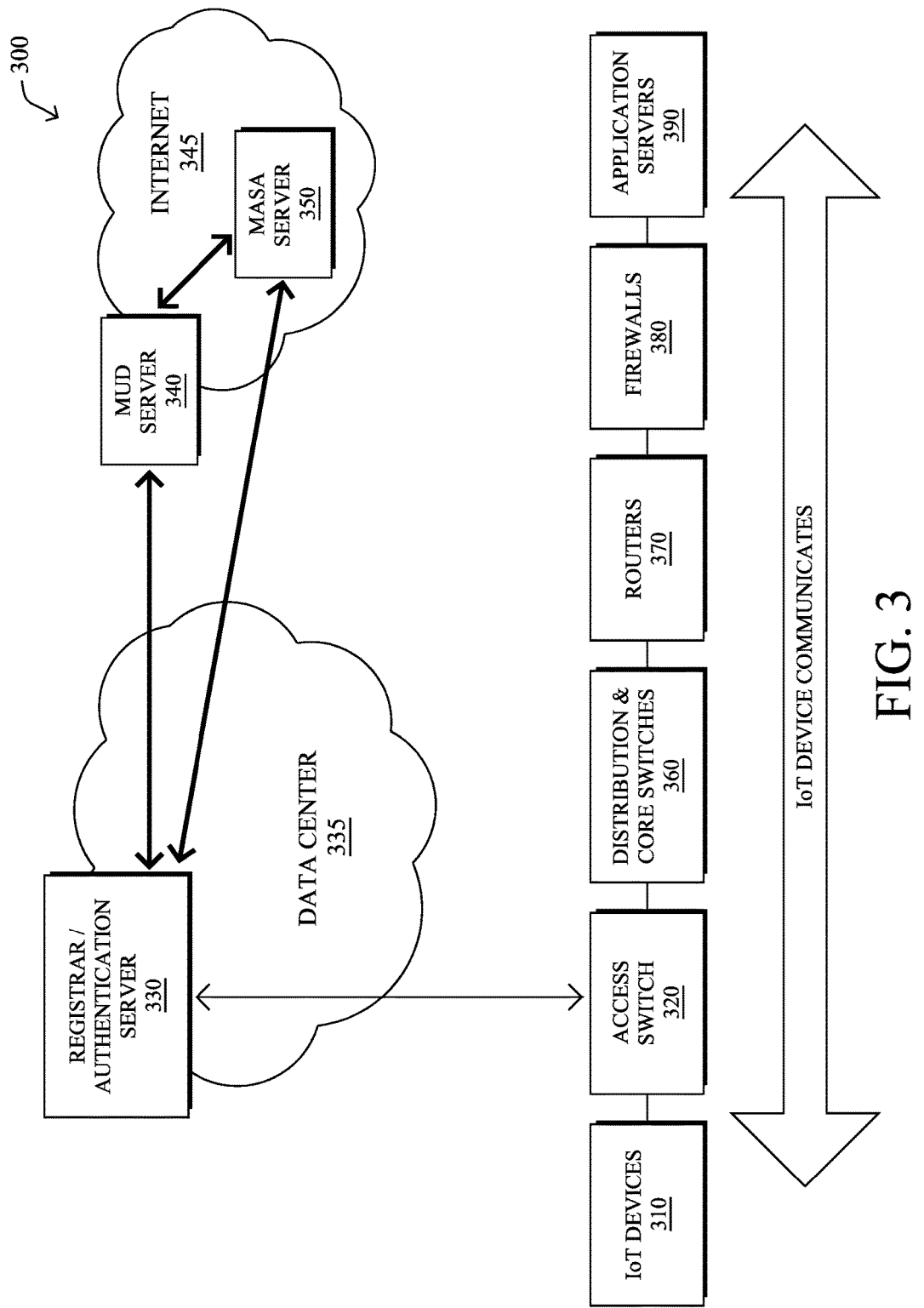
FIG. 3 illustrates an example environment for provisioning security policies for devices (e.g., IoT devices)

FIG. 3 illustrates a detailed network view 300 in accordance with one or more embodiments described herein, where devices (e.g., IoT devices) 310 communicate with the network 300 through an access point/switch 320 to reach the rest of the network. (Note that IoT devices may have wireless and/or wired access to the network. As such, though the network access point is shown in FIG. 3 as an access switch 320, those skilled in the art will understand that device 320 could be an access switch, wireless access point, gateway, etc.)

From a network administration perspective, IoT devices 310 are generally considered less trustworthy that other network devices (e.g., distribution/core switches 360, routers 370, firewalls 380, etc.), and can be subjected to exploits. Generally, access control (e.g., access control lists or "ACLs") have been applied at the access port of access switch 320, and access is granted into the network so the IoT devices can communicate with their corresponding application server(s) 390.

In some IoT verticals (e.g., connected lighting), vendors or manufacturers are motivated to add support for certificates (e.g., IEEE 802.1AR certificates) that can be used to authenticate the device (e.g., through a MASA server 350 somewhere within the Internet 345)), and MUD support to better help the network choose an appropriate policy (e.g., through MUD server 340, in Internet 345, often, though not always, within a same network domain as the MASA server 350).

For instance, according to the illustrative MUD protocol exchange, an IoT device may be authorized to join a network by performing a provisioning protocol exchange. For example, the IEEE standard 802.1X may be performed, where the provisioning device uses its IEEE 802.1AR Initial Device Identifier (IDevID) or Locally Significant Device Identifier (LDevID) that contains a MUD URI. (Note that device on-boarding could also be achieved using Dynamic Host Configuration Protocol (DHCP) or Link Layer Discovery Protocol (LLDP) packets carrying the MUD URI rather than using a certificate. In this case the access switch 320 would retrieve the MUD URI from these packets and send to the Policy Engine 330 within a relevant datacenter 335 (e.g., through "RADIUS", as understood in the MUD protocol—the "RADIUS" packets may be known as media access control (MAC) authentication bypass (MAB) packets)).

During the on-boarding process, the AAA/registrar 330 typically authenticates the IoT devices with the MASA server 350, i.e., receiving a voucher or other authorization tokens from the MASA when the IoT device is authentic. Once authenticated, a typical on-boarding process then allows the AAA/registrar 330 to separately request the MUD File from the MUD Server 340. The MUD file contains details of the network policy for effective IoT device functioning which could be access levels, bandwidth, and any other network or security requirements. The AAA/registrar 330 sends details of the provisioned IoT device and policy requirements from the MUD File to the access switch 320, and the IoT device 310 starts its communication to its associated application servers 390.

The combination of an edge network device (access switch 320) providing access control and a AAA server 330 is ideal for providing the network side of the solution. However, the communication between these two devices is not ideal, where the policy that has to be placed on the access port must be reset several times based on the different state of the device.

Figure 4A:
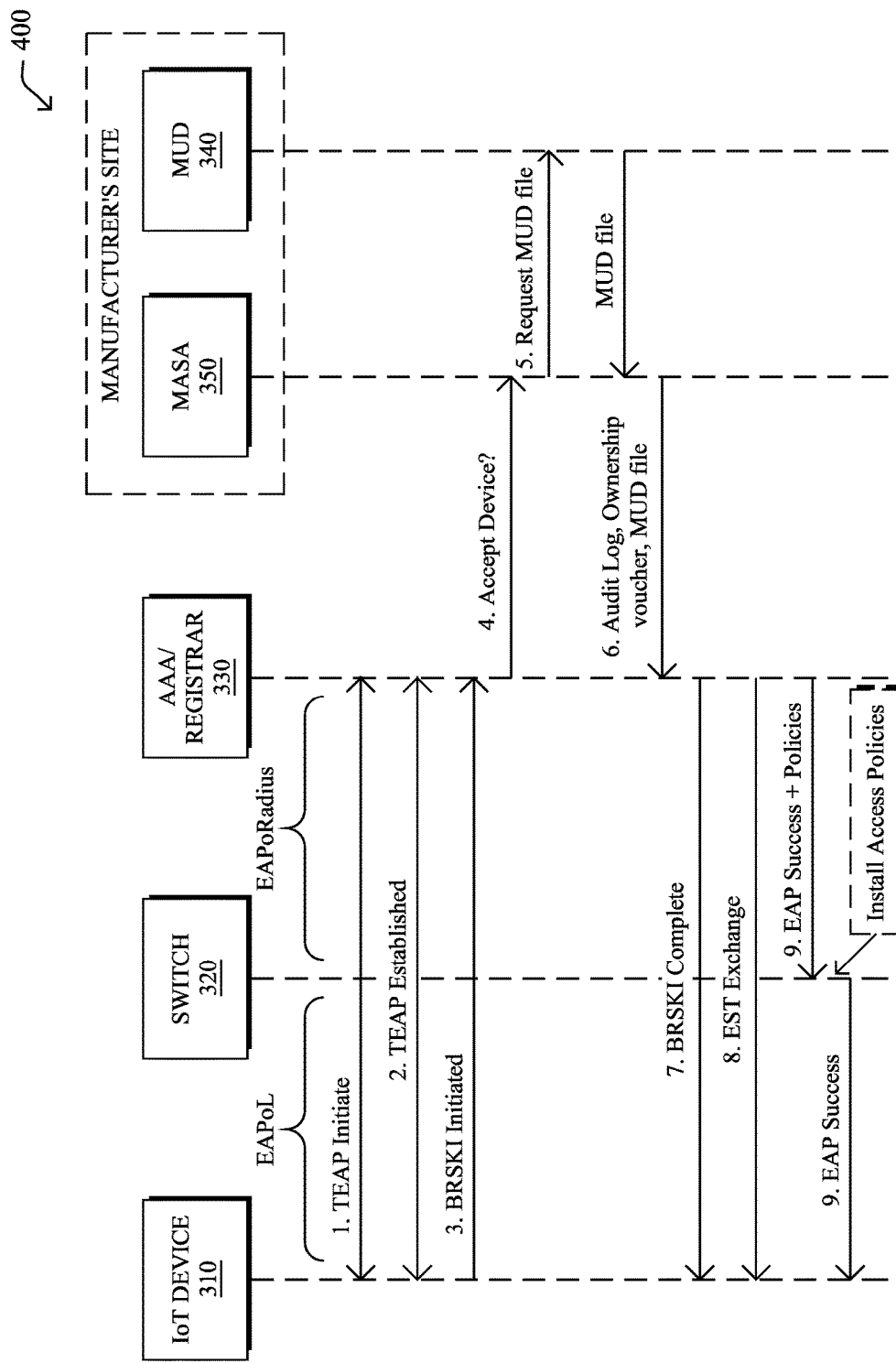
FIG. 4A illustrates an example message flow for zero-touch device provisioning.

Operationally, therefore, the present disclosure provides a technique (e.g., illustrated in message flow 400 of FIG. 4A and described below) to achieve the desired outcome mentioned above. In particular, the integrated method according to the techniques herein modifies the use of conventional protocols and methods to provision IoT devices into the network, including device authentication, network admission control, and installations of access control (and other authorization) policy to protect these devices. The method may make use of a tunneled Extensible Authentication Protocol (EAP) method such as Tunnel EAP (TEAP, RFC 7170), which allows for authentication-related protocols to executed before the EAP authentication is considered successful. Illustrative steps 1-9 are as follows, as referenced in FIG. 4A, though notably the inclusion of all of the steps, as well as the ordering of certain steps, is merely one example embodiment, and the illustrative message flow 400 of FIG. 4A is not meant to be limiting to the scope of the present disclosure.

1. An IoT device 310 illustratively initiates an IEEE 802.1X/TEAP (secure tunnel) connection to the switch using its IEEE 802.1AR IDevID to the registrar/authentication server 330. The Switch 320 blocks all access from the IoT device except for the EAPoL (EAP over LAN, a network port authentication protocol)—no special access control policy or use of MAB is needed between this time and the all security provisioning is complete.

Figure 4B:
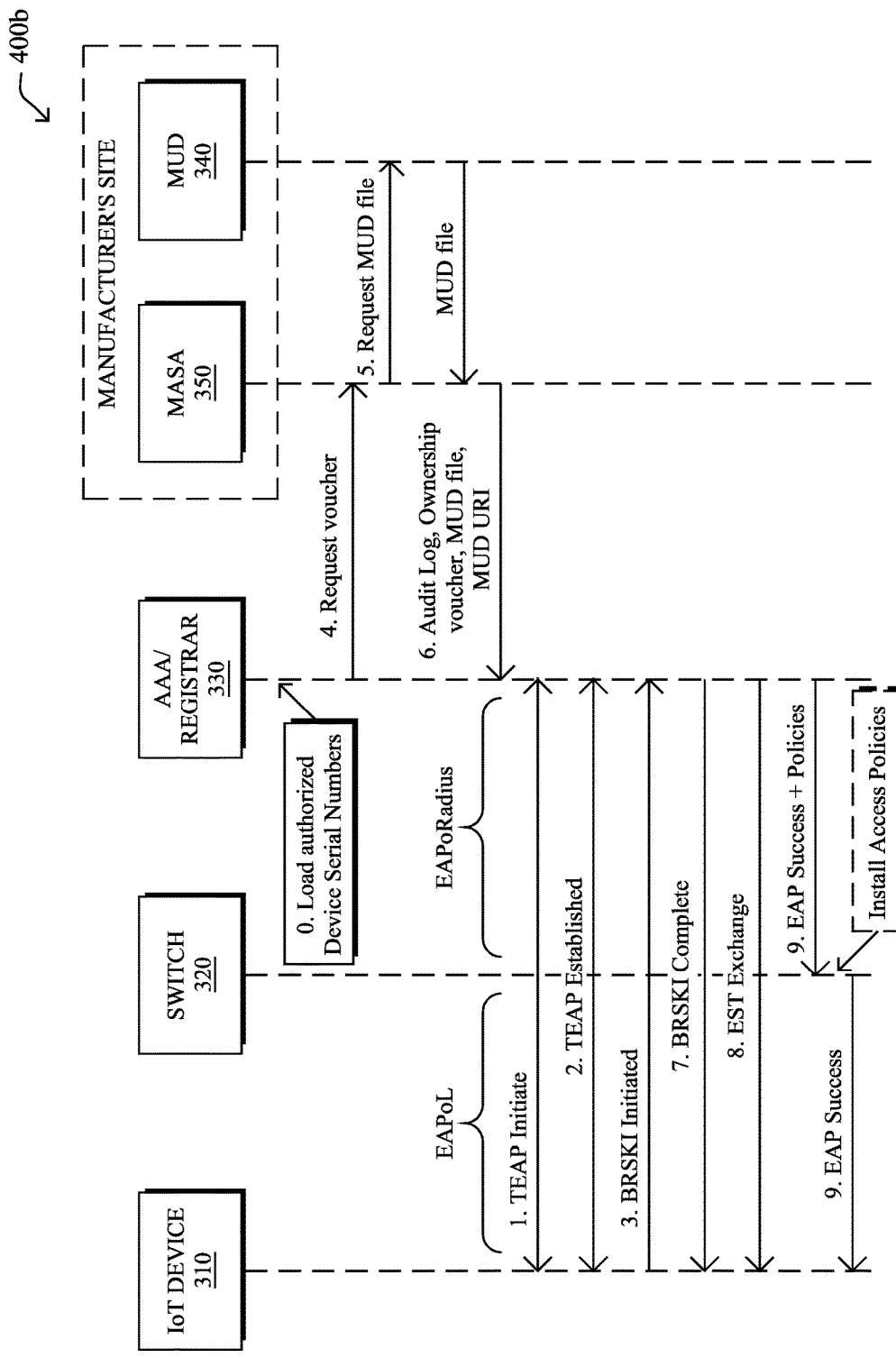
FIG. 4B illustrates another (alternative) example message flow for zero-touch device provisioning.

2. The AAA server 330 responds to the IoT device 310, Transport Layer Security (TLS) progresses, and provisional mutual authentication is achieved where the two devices agree to continue the process below without complete mutual authentication between the IoT device and the AAA server. (This may be done as described in the BRSKI method.) (Note that steps 1-2 are optionally performed before the remaining steps, though it is not necessary to do so in all embodiments of the present disclosure. See FIG. 4B below.)

3. The IoT device 310 initiates the BRSKI bootstrapping protocol to request a authentication and a security key, e.g., sending messages within TEAP. When BRSKI messages are transported within TEAP, this may allow omitting some of the complexity of the BRSKI messaging (e.g., no need for the IoT device to perform a multicast domain name service (mDNS) to find the Registrar 330).

4. BRSKI registrar 330 (e.g., used in conjunction with the AAA server 330, though optionally separate servers) asks the BRSKI MASA server 350 for information to determine whether it should accept the device (e.g., a voucher and audit log). Note that if the IoT device included a MUD URI in its request, the Registrar may send that to the MASA server. If the IoT device does not include a MUD URI, however, then MASA server may be able to identify a correct MUD file (step 5 below) based on information received from Registrar.

5. The MASA server 350 requests a MUD file from the MUD server 340. Note that because these servers are administrated by the same manufacturer they can really be two roles of one server.

6. The MASA server 350 receives and returns the MUD file (e.g., for the class of IoT device that is being registered) to the Registrar 330 along with the BRSKI state for the device. The Registrar now has all it needs to complete full authentication of the TLS session, e.g., in accordance with the conventional BRSKI operation.

7. BRSKI operation between the Registrar and IoT device completes as normal. Now the IoT device has all it needs to complete full authentication of the TLS session as described in the BRSKI method.

8. Optionally, Enrollment over Secure Transport (EST) provisioning a local certificate for the IoT device may be performed through the TEAP method.

9. When the Registrar 330 is convinced that the device is fully provisioned, it returns an EAP Success to the switch 320 telling it to open the port for the device, and also passes the access control (authorization) policies to be installed immediately before opening the port. The IoT device is thus securely provisioned and can only communicate with authorized servers according to the MUD policy.

As mentioned above, certain steps of the above flow 400 may actually be performed in a different order, omitted, etc. For instance, there is an option specifically contemplated herein where ownership vouchers may be preloaded. For example, as shown in the alternative flow 400b of FIG. 4B, in some cases, the Registrar 330 may need to contact the vendor/manufacturer in advance, such as when the target network is "air-gapped" (a network security measure to ensure that a secure computer network is physically isolated from unsecured networks, such as the public Internet or an unsecured local area network). In such a case, the registrar/AAA 330 may be preloaded (step "0") with authorized vendor device serial numbers. The message flow 400b of FIG. 4B may thus be slightly different from flow 400 of FIG. 4A above (e.g., a step-by-step order that follows as: 0, 4-6, then 1-3, then 7-9, rather than progressing from 1-9). Still other alternatives may be available, with additional, fewer, or rearranged steps, and those shown herein are merely examples for illustration.

Figure 5:
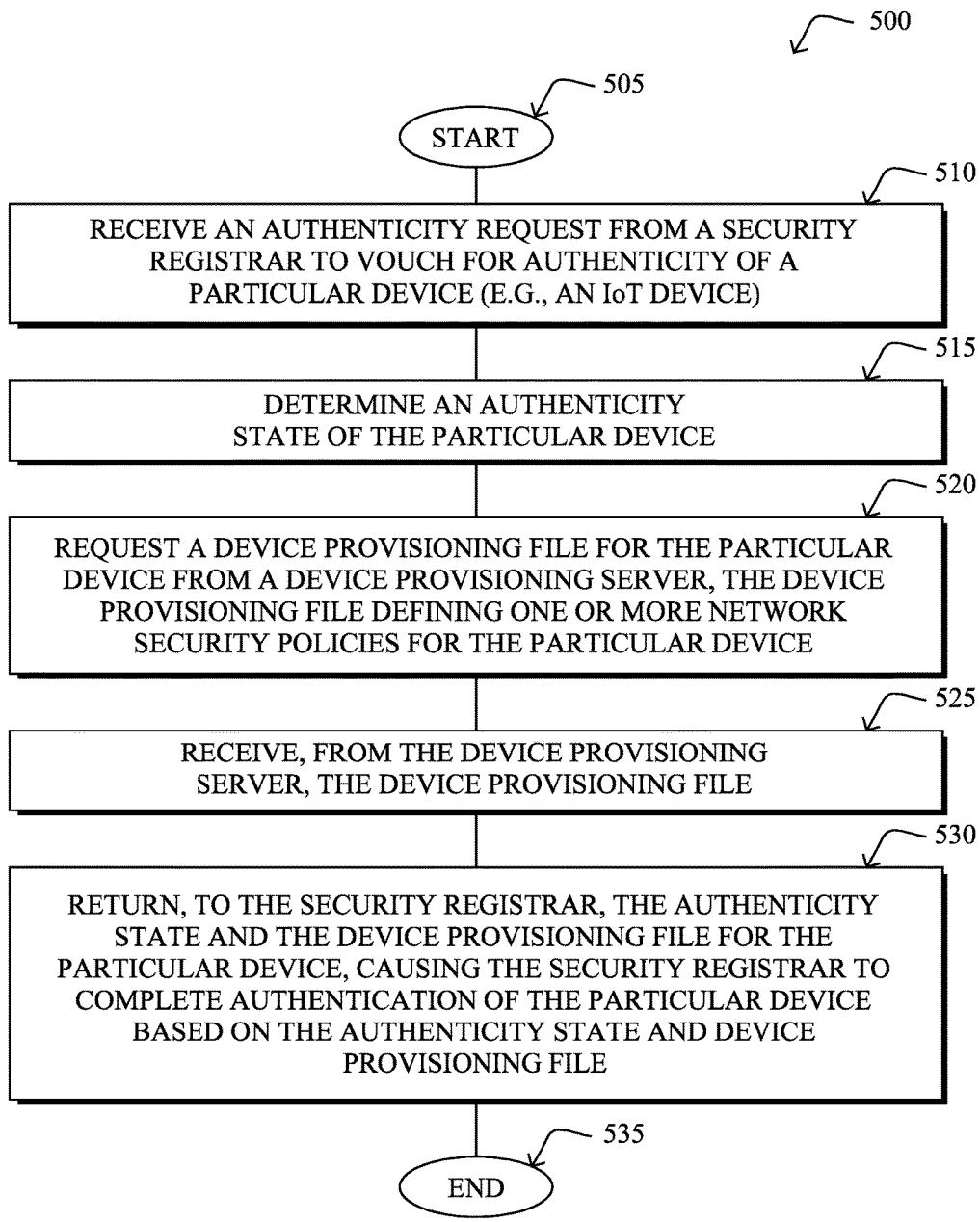
FIG. 5 illustrates an example simplified procedure for zero-touch device provisioning, particularly from the perspective of an authorized signing authority server.

To reiterate the techniques described above, FIG. 5 illustrates an example simplified procedure for zero-touch device provisioning in accordance with one or more embodiments described herein, particularly from the perspective of an authorized signing authority server (e.g., MASA server). For example, a non-generic, specifically configured device (e.g., device 200) may perform procedure 500 by executing stored instructions (e.g., process 248). The procedure 500 may start at step 505, and continues to step 510, where, as described in greater detail above, the authorized signing authority server (e.g., MASA server 350) receives an authenticity request (e.g., a BRSKI-based request) from a security registrar 330 (e.g., BRSKI registrar and/or AAA server) to vouch for authenticity of a particular device 310 (e.g., an IoT device). Based on receiving the authenticity request, the authorized signing authority server may then determine an authenticity state of the particular device in step 515, and may also request a device provisioning file (e.g., MUD file) for the particular device from a device provisioning server (e.g., MUD server 340), the device provisioning file defining one or more network security policies for the particular device. Note that as described above, the authenticity request may contain a MUD URI for the particular device, but if not, then the authorized signing authority server may determine a proper device provisioning file for the particular device to request (e.g., which MUD file to get from the MUD server) based on other information within the authenticity request from the security registrar.

In step 525 the authorized signing authority server may receive the device provisioning file from the device provisioning server (e.g., specifically for the particular device, or else based on a class of device associated with the particular device). Note that as mentioned above, the authorized signing authority server and the device provisioning server may actually be co-located processes on a same server, so requesting and receiving in steps 520-525 may actually comprise function calls within a single process or else across collaborating processes of a unified server.

In step 530, the authorized signing authority server 350 may return the authenticity state (e.g., voucher/token and audit log) and the device provisioning file (e.g., MUD file) for the particular device to the security registrar 330, causing the security registrar to complete authentication of the particular device based on the authenticity state and the device provisioning file, as described above, and as will be appreciated by those skilled in the art. The illustrative and simplified procedure 500 may then end in step 535.

Figure 6:
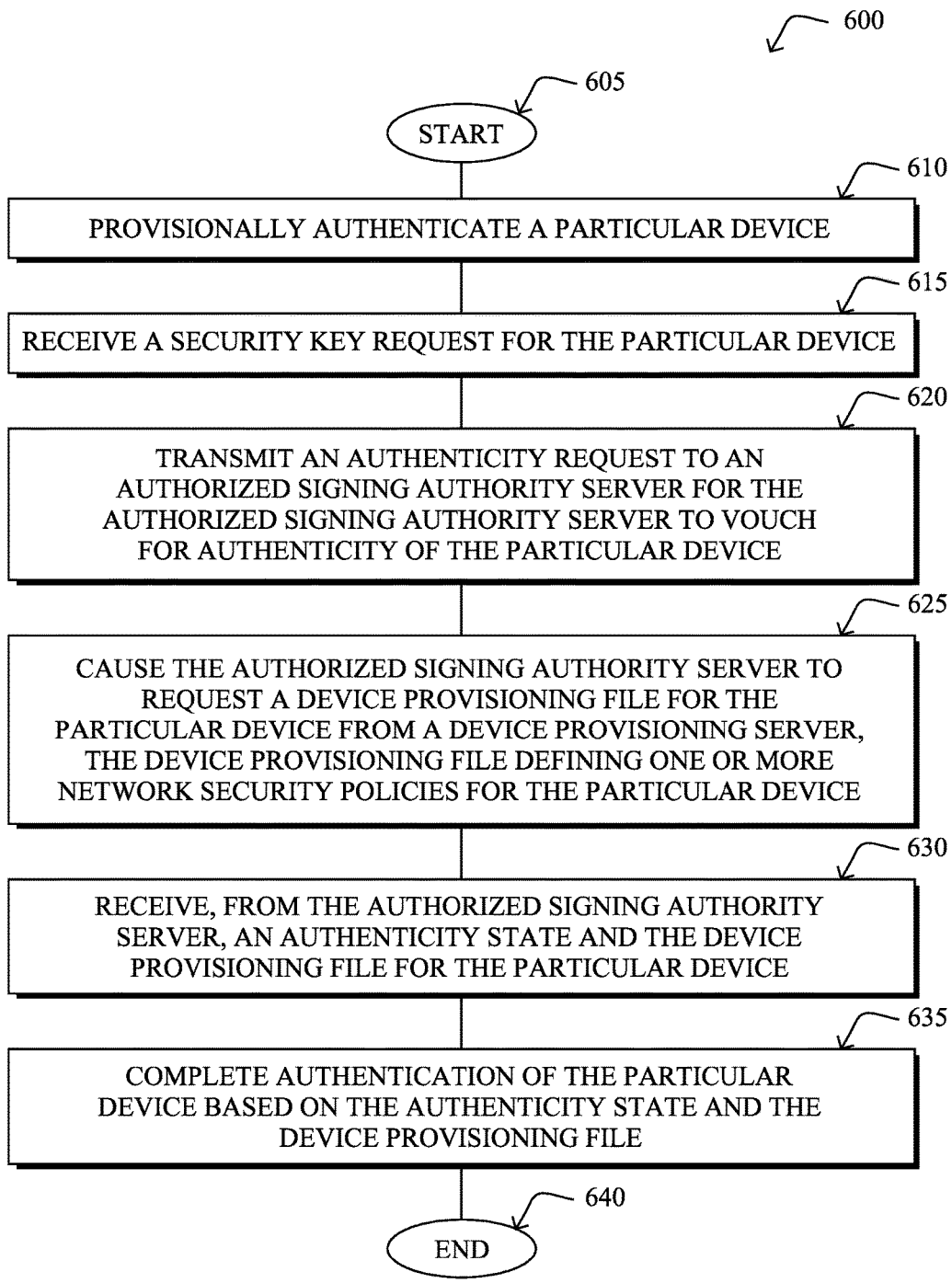
FIG. 6 illustrates another example simplified procedure for zero-touch device provisioning, particularly from the perspective of a security registrar.

Further, FIG. 6 illustrates another example simplified procedure for zero-touch device provisioning in accordance with one or more embodiments described herein, particularly from the perspective of a security registrar (e.g., BRSKI-registrar and/or AAA server). For example, a non-generic, specifically configured device (e.g., device 200) may perform procedure 600 by executing stored instructions (e.g., process 248). The procedure 600 may start at step 605, and continues to step 610, where, as described in greater detail above, the security registrar 330 may provisionally authenticate a particular device (e.g., IoT device) prior to receiving a security key request (e.g., optionally performing steps 1-2 above, prior to steps 3-7). In step 615, the security registrar may receive a security key request for a particular device (e.g., a BRSKI-based request, which may be encapsulated within a TEAP message). As such, in step 620, the security registrar may transmit an authenticity request to an authorized signing authority server (e.g., MASA server 350) for the authorized signing authority server to vouch for authenticity of the particular device. As described in detail above, in step 625 the authenticity request causes the authorized signing authority server to request a device provisioning file (e.g., MUD file) for the particular device from a device provisioning server (e.g., MUD server 340), the device provisioning file defining one or more network security policies for the particular device. Upon receiving, from the authorized signing authority server, an authenticity state and the device provisioning file for the particular device in step 630, then in step 635 the security registrar may complete authentication of the particular device based on the authenticity state and the device provisioning file, accordingly, and the illustrative simplified procedure 600 ends in step 640.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for zero-touch IoT device provisioning. In particular, the techniques herein increase security, as the MAB is not needed at all, because all security provisioning can be done as part of the EAP method before the port is opened to the device. Said differently, the techniques herein simplify the network processing, and optimize the number of message flows between the enterprise and the manufacturer servers. For instance, rather than authenticating a device (obtaining a voucher/token) through a MASA server, and then requesting a MUD file from a MUD server, the techniques herein bypass the multiple stages, and configured the MASA server to obtain the MUD file directly. Without the optimizations provided herein, policies on the port would need to be updated more frequently, with more messages back and forth (notably twice visiting manufacturer servers, as noted above).

Further, the techniques herein allow for the MUD file for a device to be determined without it passing a MUD URI from the IoT device, since the MASA server can determine what the type of IoT device is, and ask the MUD server for the correct MUD file. That is, without the techniques herein, there is no opportunity for providing a MUD file when the device doesn't present its URI to the AAA server. This would be specifically beneficial for supporting existing devices with IEEE 802.1AR IDevID but no MUD information in the certificate.

While there have been shown and described illustrative embodiments that provide for zero-touch IoT device provisioning, it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments. Moreover, while specific protocols and associated devices have been such, such as MUD, other suitable protocols may be used in accordance with the techniques described above. In addition, while certain devices are shown, such as routers, access points, gateways, firewalls, etc., other suitable devices may be used, accordingly. That is, the embodiments have been shown and described herein with relation to specific network configurations (orientations, topologies, protocols, terminology, etc.). However, the embodiments in their broader sense are not as limited, and may, in fact, be used with other types of networks and protocols, regardless of their nomenclature or underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at an authorized signing authority server, an authenticity request from a security registrar to vouch for authenticity of a particular device;
   determining, by the authorized signing authority server based on receiving the authenticity request, an authenticity state of the particular device;
   requesting, by the authorized signing authority server based on receiving the authenticity request, a device provisioning file for the particular device from a device provisioning server, the device provisioning file defining one or more network security policies for the particular device;
   receiving, at the authorized signing authority server from the device provisioning server, the device provisioning file; and
   returning, from the authorized signing authority server to the security registrar, the authenticity state and the device provisioning file for the particular device, causing the security registrar to complete authentication of the particular device based on the authenticity state and the device provisioning file.

2. The method as in claim 1, wherein the authorized signing authority server is a Manufacturer Authorized Signing Authority (MASA) server.

3. The method as in claim 1, wherein the security registrar is a Bootstrapping Remote Secure Key Infrastructures (BRSKI) registrar, and wherein the authenticity request is a BRSKI-based request.

4. The method as in claim 1, wherein the security registrar is an authentication, authorization, and accounting (AAA) server.

5. The method as in claim 1, wherein the particular device is an Internet of Things (IoT) device.

6. The method as in claim 1, wherein the device provisioning file is a Manufacturer Usage Description (MUD) file.

7. The method as in claim 1, wherein the authenticity request contains a Manufacturer Usage Description (MUD) uniform resource identifier (URI) for the particular device.

8. The method as in claim 1, wherein the authenticity request does not contain a Manufacturer Usage Description (MUD) uniform resource identifier (URI) for the particular device, the method further comprising:
   determining a proper device provisioning file for the particular device to request from the device provisioning server based on other information within the authenticity request from the security registrar.

9. The method as in claim 1, wherein the device provisioning file is based on a class of device associated with the particular device.

10. The method as in claim 1, wherein the authorized signing authority server and the device provisioning server are co-located processes on a same server.

11. A method, comprising:
    receiving, at a security registrar, a security key request for a particular device;
    transmitting, from the security registrar, an authenticity request to an authorized signing authority server for the authorized signing authority server to vouch for authenticity of the particular device;
    causing, by the authenticity request, the authorized signing authority server to request a device provisioning file for the particular device from a device provisioning server, the device provisioning file defining one or more network security policies for the particular device;
    receiving, at the security registrar from the authorized signing authority server, an authenticity state and the device provisioning file for the particular device; and
    completing, by the security registrar, authentication of the particular device based on the authenticity state and the device provisioning file.

12. The method as in claim 11, wherein the authorized signing authority server is a Manufacturer Authorized Signing Authority (MASA) server.

13. The method as in claim 11, wherein the security registrar is a Bootstrapping Remote Secure Key Infrastructures (BRSKI) registrar, and wherein the authenticity request is a BRSKI-based request.

14. The method as in claim 13, wherein the security key request is a BRSKI-based request that is encapsulated within a Tunnel Extensible Authentication Protocol (TEAP) message.

15. The method as in claim 11, wherein the security registrar is an authentication, authorization, and accounting (AAA) server.

16. The method as in claim 11, wherein the particular device is an Internet of Things (IoT) device.

17. The method as in claim 11, wherein the device provisioning file is a Manufacturer Usage Description (MUD) file.

18. The method as in claim 11, wherein the authenticity request contains a Manufacturer Usage Description (MUD) uniform resource identifier (URI) for the particular device.

19. The method as in claim 11, further comprising:
provisionally authenticating the particular device prior to receiving the security key request.

20. An apparatus, comprising:
one or more network interfaces configured to communicate in a computer network;
a processor coupled to the network interfaces and adapted to execute one or more processes; and
a memory configured to store an authorized signing authority server process executable by the processor, the process when executed operable to:
receive an authenticity request from a security registrar to vouch for authenticity of a particular device;
determine, based on receiving the authenticity request, an authenticity state of the particular device;
request, based on receiving the authenticity request, a device provisioning file for the particular device from a device provisioning server, the device provisioning file defining one or more network security policies for the particular device;
receive, from the device provisioning server, the device provisioning file; and
return, to the security registrar, the authenticity state and the device provisioning file for the particular device, causing the security registrar to complete authentication of the particular device based on the authenticity state and the device provisioning file.

* * * * *

UNITED STATES PATENT AND TRADEMARK OFFICE
CERTIFICATE OF CORRECTION

PATENT NO. : 10,298,581 B2
APPLICATION NO. : 15/582113
DATED : May 21, 2019
INVENTOR(S) : Rashmikant B. Shah et al.

Page 1 of 1

It is certified that error appears in the above-identified patent and that said Letters Patent is hereby corrected as shown below:

In the Specification

In Column 1, Line 26, please amend as shown:
referring to the following description in conjunction with Signed and Sealed this
Fourteenth Day of January, 2020

Andrei Iancu
*Director of the United States Patent and Trademark Office*